Patented Mar. 8, 1927.

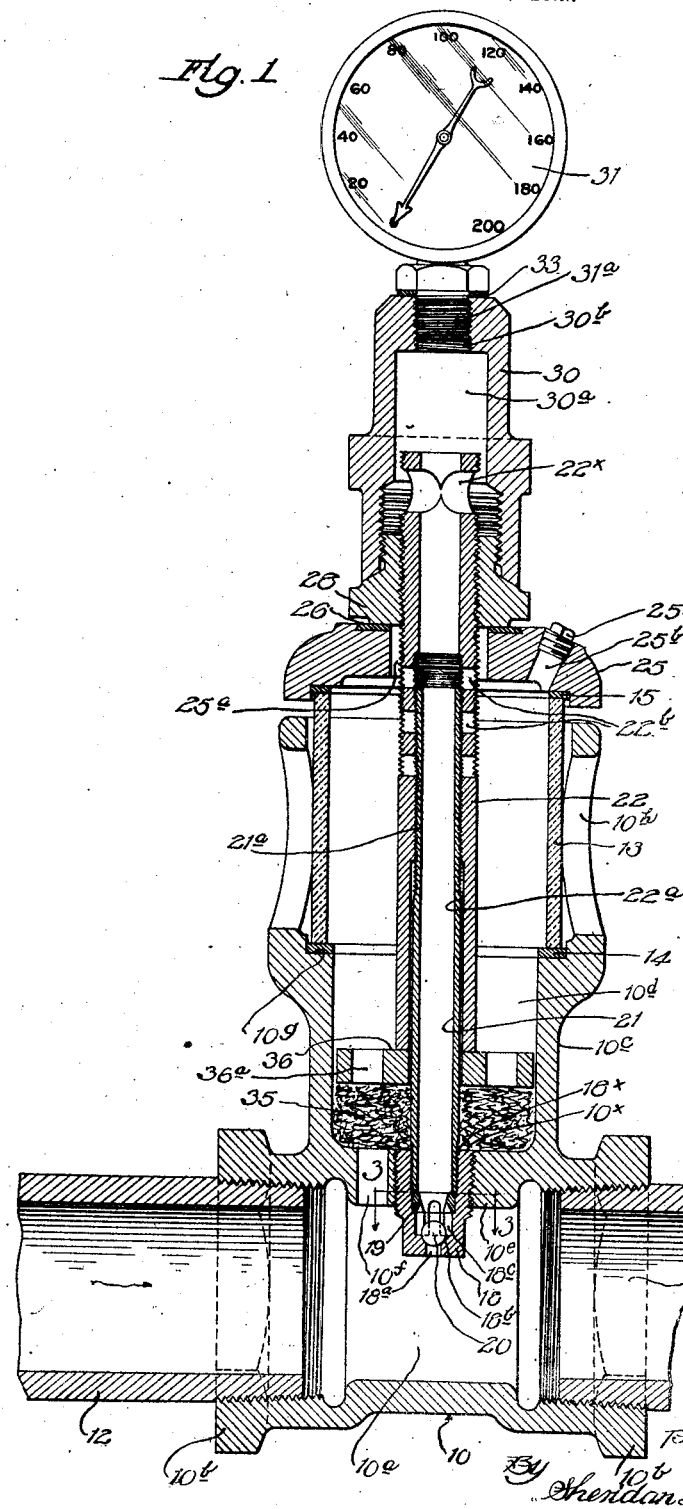

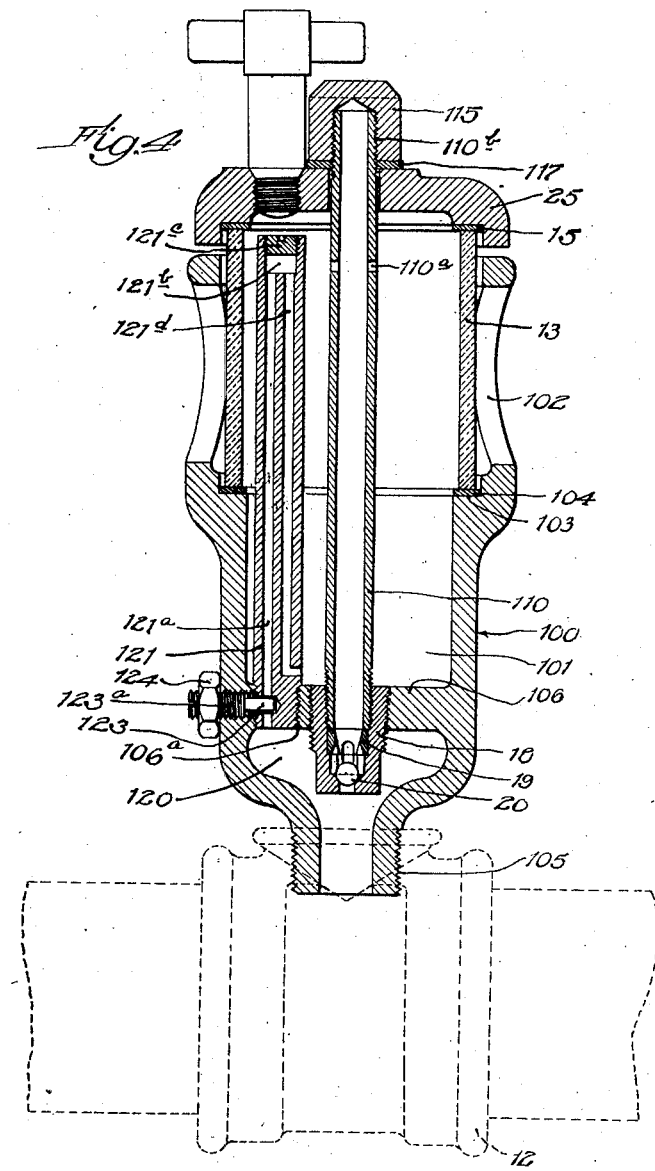

1,620,253

UNITED STATES PATENT OFFICE.

PHILETUS W. GATES, OF CHICAGO, ILLINOIS, ASSIGNOR TO HANNA ENGINEERING WORKS, OF CHICAGO, ILLINOIS, A CORPORATION OF ILLINOIS.

LUBRICATOR.

Application filed February 27, 1922. Serial No. 539,337.

This invention relates to improvements in lubricators, more especially that type of lubricator shown in the patents to Albert J. Gates, No. 1,211,431, January 9, 1917; P. W. Gates No. 1,211,432, January 9, 1917 and 1,195,349, August 22, 1916. All of the lubricators disclosed in the patents mentioned, as well as that embodying the present invention, are primarily intended for use with pneumatically or steam actuated mechanisms, functioning in cycles in a well known manner, such, for example, as riveters, pumps, engines and the like, the purpose being to supply the lubricating fluid in comminuted condition to the actuating fluid for flow into and distribution throughout the reciprocating mechanism.

In the invention of the instant application, I provide means to entrap the actuating fluid at substantially maximum pressure in the lubricator, which will afford a differential in pressure between the lubricator air or steam line when the actuating fluid is flowing through the latter to actuate the mechanism. In the lubricators of the patents mentioned above, the actuating fluid in the lubricators is in substantial balance with that in the lines. I find it advisable in some installations to provide and utilize this differential pressure and for that purpose have invented the device of this application.

Another object of this invention resides in the structure for the carrying out of the purpose outlined above.

These and other objects will be more fully set forth and described in the following specification and shown in the accompanying drawing, in which—

Figure 1 is a vertical section through a lubricator embodying my invention;

Fig. 2 is a vertical section through the check valve shown to an enlarged scale;

Fig. 3 is a plan view of the detail shown in Fig. 2; and

Fig. 4 is a vertical section of another embodiment of my invention.

Like numerals refer to like elements in the drawing, in which 10 indicates generally a T-form body having the lateral duct $10^a$ therethrough with the arms $10^b$ internally threaded for engagement with and insertion in an actuating fluid line 12. The projecting stem $10^c$ is chambered as indicated by numeral $10^d$ to provide a lubricant reservoir, being provided with a diaphragm $10^e$ at its juncture with the arms $10^b$, this diaphragm being provided with a plurality of apertures or ducts $10^f$ through which the lubricant may flow to the actuating fluid line. The stem or reservoir $10^c$ is provided with internal shoulder $10^g$ and the side openings $10^h$, a cylinder of glass or the like 13 being located within the chamber $10^d$. A packing washer of cork, rubber, or the like, as indicated by numeral 14, is interposed between the shoulder $10^g$ and the cylinder 13. Similarly a packing ring 15 is provided on the top of the cylinder 13.

A threaded central aperture $10^x$ is provided in the diaphragm $10^e$ and in this is threaded a plug 18 having a central aperture $18^a$ provided with a valve seat $18^b$. Upwardly of the valve seat the passage $18^a$ is enlarged as shown in Fig. 2, for example, and a plurality of vertical passages $18^c$ are in communication therewith along their sides. A shoulder $18^d$ is provided intermediate the top and bottom of the plug 18, the aperture $18^a$ being enlarged to permit the insertion of the check collar 19, seating upon the shoulder $18^d$ and provided with tapering ribs $19^a$ overhanging at their lower portions the aperture $18^a$, the collar 19 being provided with a central aperture $19^b$. A ball 20 is mounted in the enlarged portion of aperture $18^a$ normally seating on the seat $18^b$, to close the passage $18^a$. This ball, in a well-known manner, is capable of vertical movement, such movement being restrained in one direction by the ribs $19^a$. When the ball is lifted off the seat, the actuating fluid may flow therearound through the passages $18^c$ and outwardly through the passages $19^b$ through the spaces $19^x$ between the ribs $19^a$. The upper portion of the passage or aperture $18^a$ is threaded as indicated at $18^x$, and threadedly engaging such aperture is the tube 21, which may be threaded into engagement with the plug 18 as stated to a position maintaining the collar 19 in proper position. The tube 21 is threaded along its upper external periphery as indicated at $21^a$, and threaded into engagement therewith is the tube or sleeve 22 having its bore slightly enlarged at the lower portion as indicated by numeral $22^a$ to clear the tube 21. A plurality of transverse apertures $22^b$ are provided at the upper portion of the sleeve 22.

Located upon the packing washer or ring 15 is the cap 25, shouldered to seat upon the washer 15 and grooved at its top for the placing of a packing ring or washer 26. The cap is centrally apertured at 25$^a$ to clear the sleeve 22 and is provided with a filler opening 25$^b$ normally closed by the threaded plug 25$^c$.

A nut 28 engages the threaded sleeve 22 and is operated with a portion contactable with the packing washer 26. Screwing the nut 28 downwardly upon the sleeve 22 will result in drawing the previously described parts together and maintaining an air-tight fit between the cap 25, washers, glass cylinder, etc.

The sleeve 22 extends upwardly of the nut 28 and is provided with the cross apertures 22$^x$ at the top. An elongated cap 30 threadedly engages the exterior of the nut 28 being provided with an interior chamber or cavity 30$^a$, from which leads an aperture 30$^b$ internally threaded to permit insertion of a stem 31$^a$ of a gauge 31. It is obvious that the gauge may be replaced where not desirable by a threaded closure plug, or the like. A packing ring 33 is interposed between the gauge stem 31$^a$ and the cap 30.

Fibrous material such as felt, waste, sponge, or the like, indicated by numeral 35, is placed in the bottom of reservoir 10$^d$ and is compressed and maintained in compressed condition by means of the washer 36, which is centrally apertured for movement relative to the tube 21.

In the use of the structure described, the fibrous material 35 is compressed to the desirable condition, ordinarily to such a point that the lubricant will not flow through by gravity. This compression is effected and maintained by means of the washer 36, the sleeve 22 being screwed down upon the washer by the insertion of a nail, rod or the like, through the apertures 22$^x$, after which the cap 30 may be applied or re-applied. Assuming the actuating fluid is air under pressure in the line 12, and a mechanism under periodic operation, i. e., in cycles, by such fluid, it will be apparent that as the pressure of the fluid reaches a maximum in the line, due to compression or cutoff, the same will lift the ball 20 and permit the flow of such fluid upwardly through tube 21, apertures 22$^b$, into the reservoir chamber 10$^d$ containing the lubricant. As the pressure in the line 12 drops, due to the opening of the regulating valve or the like, such as during admission to the functioning mechanism, the ball 20 will close, entrapping the actuating fluid under pressure. This will result in a higher pressure obtaining in the lubricant reservoir than in the line and this pressure presumably coacting with the suction or wire drawing effect of the flow, the actuating fluid in the reservoir above the oil will press the lubricant through the fibrous material 35, and apertures 19, into the line 12, the result being the supply to the actuating fluid under flow, of the lubricant in a finely divided or comminuted condition whereby it will be carried by the actuating fluid into the functioning mechanism and distributed over the rubbing surfaces.

This construction results in the supply of oil to the line only when needed, that is, when the actuating fluid is flowing, as obviously when it is at rest the pressure will be balanced in the lubricant chamber and in the line, and also by the proper compression of the fibrous material 35 will prevent the flow of the oil at that time.

The gauge may be used where desired to indicate the pressure pulsations obtaining in the lubricator.

It is apparent that the lower part of the device as shown in Fig. 1, may be constructed as shown in Fig. 4 so that it may be connected to the actuating air line 12 by a T, or may be connected direct to a compressor, gas, steam or the like cylinder, in which case the compression part of the stroke of the cycle supplies the full pressure for the oil reservoir 10$^d$ and the suction part of the stroke creates a drop in pressure which determines the differential in pressure between the oil reservoir and the chamber F.

In Fig. 4 I have shown another form of my invention which dispenses with the fibrous packing 35 for preventing and regulating the flow of oil, and also the necessary means for adjusting the compression thereof.

In the form shown in Fig. 4, the lubricator is generally indicated by numeral 100 and is provided with the chamber or reservoir 101, which is provided with side openings 102, the shoulder 103 being provided intermediate the extremities of the lubricator, a packing washer 104 being mounted thereon. At its lower end, lubricator 100 is provided with a threaded reduced extremity 105, which may be threaded into a T 12, as indicated by dotted line, or to a tube or the like communicating with the interior of the compressor, or the like, not shown. At the bottom of the reservoir 101 is the partition 106, centrally apertured and threaded for engagement by the plug 18 as in the other embodiment illustrated and described above. Similarly the check collar 19 is provided to limit the ball check 20. A centrally upstanding tube 110 is threaded into the central aperture of the plug 18 and maintains the collar 19 in assembled position. This tube is provided with the ports 110$^a$ adjacent its upper extremity to permit the flow of actuating fluid from the tube into the lubricator reservoir. Tube 110 is externally threaded at its upper extremity indicated by numeral 110$^b$ and a threaded nut 215 engages the threaded end 110$^b$. A transparent cylinder of glass or the like 13 is mounted with its base on the washer 104. A cap 25, as in the other form, rests upon a washer 15 in turn resting upon the upper end of cylinder 13. A packing washer 117 is interposed between the nut 115 and cap 25, so that, as will be apparent, the screwing down of the nut 115 on tube 21 will result in the drawing together of the lubricator glass cylinder and cap 25, and the packing washers described thereby making the reservoir of the lubricator substantially airtight.

Below the partition 106, the lubricator is provided with the outlet chamber 120. The partition 106 is provided with a second aperture 106$^a$, in which is threaded a rod 121. This rod is provided with vertical duct 121$^a$ leading upwardly from the chamber 120, communicating with a chamber 121$^b$ at the top of the rod 121, this chamber being sealed at the top by the threaded plug 121$^c$. The second duct 121$^d$ leads downwardly from the chamber 121$^b$ into reservoir 101 shown in Fig. 4. A regulating pin 123 is provided extending transversely of the duct 121$^a$ near the bottom thereof, this pin being provided with a threaded shank 123$^a$ threaded in a threaded aperture in the side of the lubricator 100, being slotted at its extremity for engagement by a screw driver, or the like. Lock 124 maintains the regulating pin 123 in adjusted position, this construction permitting regulation of the size of the duct 121$^a$ and thereby regulating the discharge of oil therethrough.

The operation of this device when attached to an air line for example, is as follows:

The actuating fluid under maximum pressure will flow into tube 110 and from this into the lubricator above the surface of the lubricant. Upon drop of pressure in the line the ball check 20 will prevent efflux of the entrapped fluid in the reservoir so that a maximum pressure is maintained in the latter during actuation of any periodically operated mechanism. The entrapped fluid under pressure in the lubricator forces a portion of the lubricant upwardly through duct 121$^d$ and downwardly through duct 121$^a$ into the chamber 120, the amount of discharge being regulable by the valve pin 123. The discharged oil will flow into the line and be conveyed with the actuating fluid to the mechanism actuated thereby. It will be obvious that in this construction, as in the other previously described, there is means to normally prevent the flow of the lubricant into the line so that the lubricant is only supplied when the fluid pressure is actuating some mechanism, for example. Of course, should the fluid pressure be cut off short of the lubricator in the line, leaving the actuating fluid entrapped therein, it may be advisable to permit the escape of such fluid through the filler opening, if the line is to remain inactive for any considerable period of time, thus preventing the discharge of the lubricant into the line during periods of non-use.

It will be apparent that my invention is susceptible of embodiment in a number of forms and I do not wish to be restricted to the form shown and described, except as defined in the appended claims.

What I claim is:

1. In a device of the class described, a lubricator comprising a body portion having a lubricant reservoir therein, a transverse actuating fluid passage, an apertured partition separating said reservoir from said passage, fibrous means located in said reservoir to normally prevent the flow of the lubricant therefrom, means to maintain said fibrous means in compressed condition comprising an apertured disk, a fluid supply tube extending from said passage into said reservoir.

2. In a device of the class described, a lubricator comprising a body portion having a lubricant reservoir therein, a transverse actuating-fluid passage, an apertured partition separating said reservoir from said passage, fibrous means located in said reservoir to normally prevent the flow of the lubricant therefrom, means to maintain said fibrous means in compressed condition comprising an aperture disk, a fluid supply tube extending from said passage into said reservoir, through said disk.

3. In a device of the class described, a lubricator comprising a body portion having a lubricant reservoir therein, a transverse actuating fluid passage, an apertured partition separating said reservoir from said passage, fibrous means located in said reservoir to normally prevent the flow of the lubricant therefrom, means to maintain said fibrous means in compressed condition comprising an aperture disk, a fluid supply tube extending from said passage into said reservoir, through said disk, and means associated with said tube to maintain said disk in position.

4. In a device of the class described, a lubricator comprising a body portion having a lubricant reservoir therein, a transverse actuating fluid passage, an apertured partition separating said reservoir from said passage, fibrous means located in said reservoir to normally prevent the flow of the lubricant therefrom, means to maintain said fibrous means in compressed condition comprising an apertured disk, a fluid supply tube extending from said passage into said reservoir, through said disk, and means associated with said tube to maintain said disk in position, said last named means comprising an apertured sleeve.

5. A lubricator comprising a chambered body portion, a tube extending into said body portion, a cap member for said body portion apertured to surround said tube, a threaded nut engaging said tube and bearing on said cap to maintain the same in assembled relation to said body portion, and a second cap carried by said nut, said tube being in communication with the interior thereof.

6. In a lubricator, a chambered body portion having a bottom partition, a threaded tube extending into said chamber of said body portion from said partition, fibrous material mounted upon said partition, means to compress and maintain said fibrous material in compressed condition comprising an apertured disk, an apertured sleeve engaging said tube and bearing upon said disk.

7. In combination with an actuating fluid line, a lubricator comprising a lubricant reservoir, a lubricant duct leading from said reservoir, a second duct in communication with said reservoir and said line, means co-acting with said second duct to permit the flow of the actuating fluid to said reservoir under pressure from said line, said means being operable to prevent the return flow of said actuating fluid, and means to regulate discharge through said lubricant duct.

In testimony whereof, I have subscribed my name.

PHILETUS W. GATES.